United States Patent Office 2,994,905
Patented Aug. 8, 1961

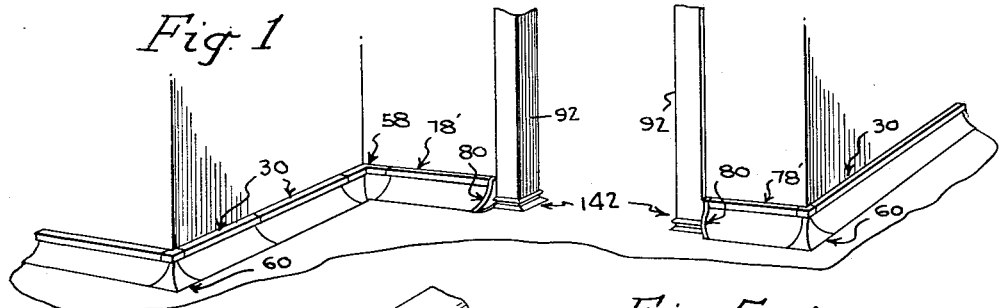
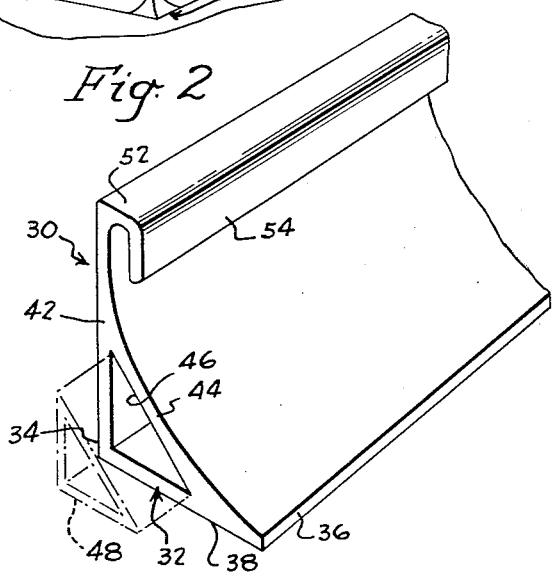
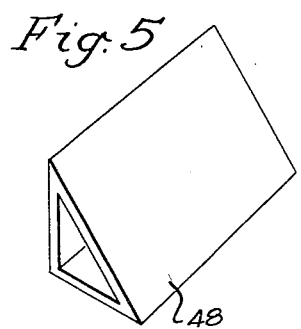
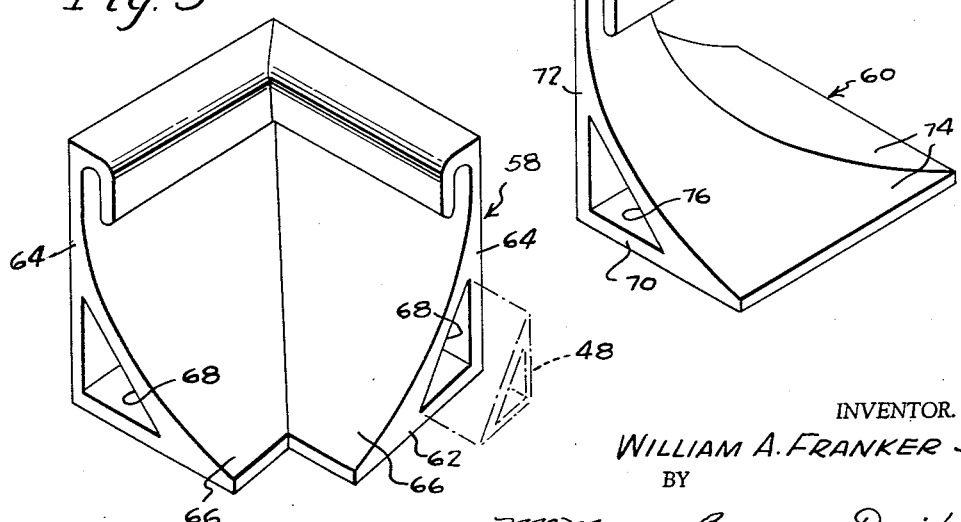

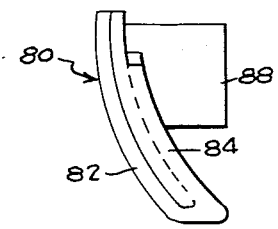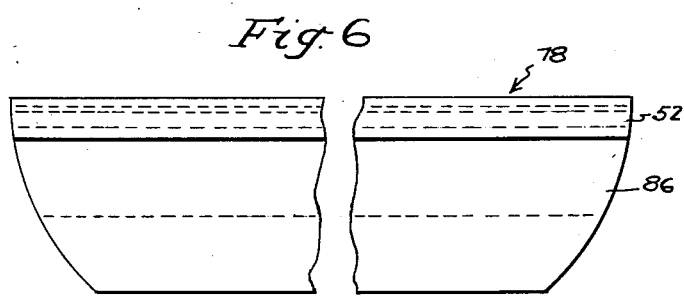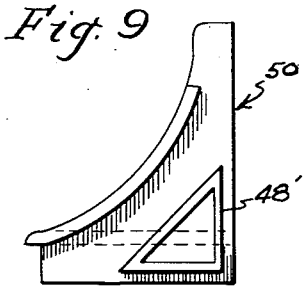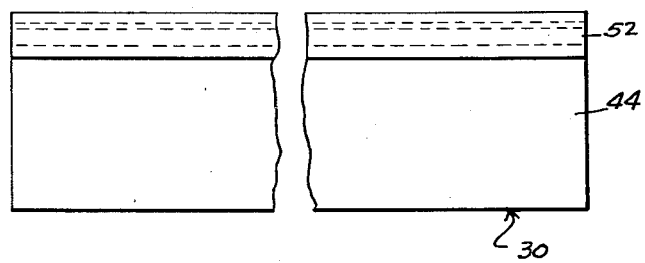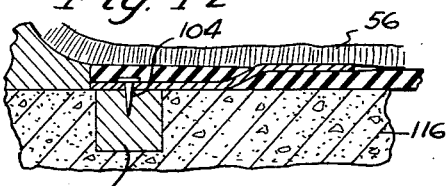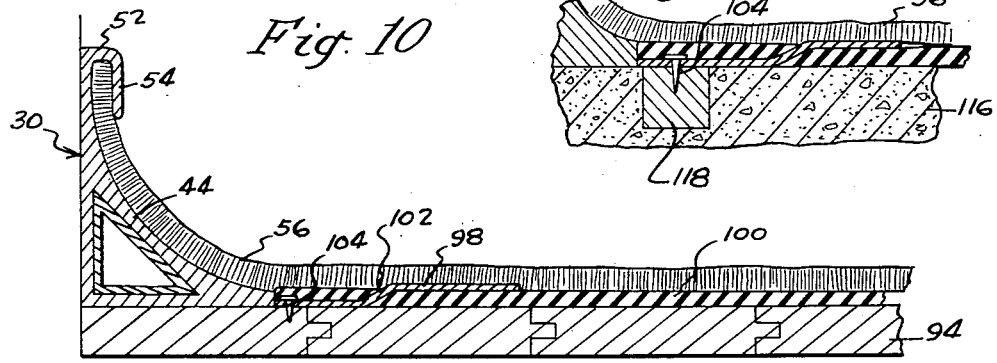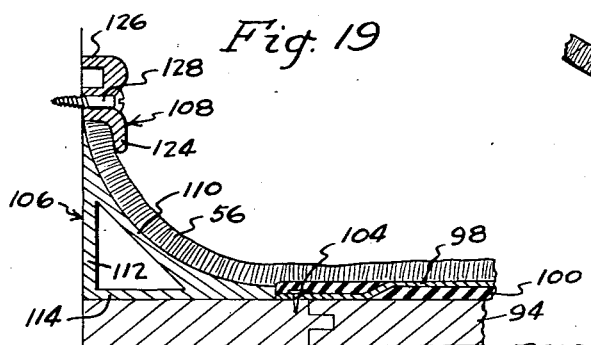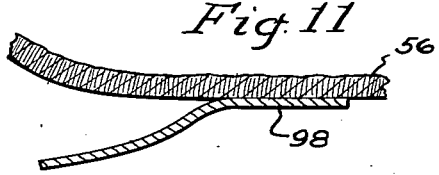

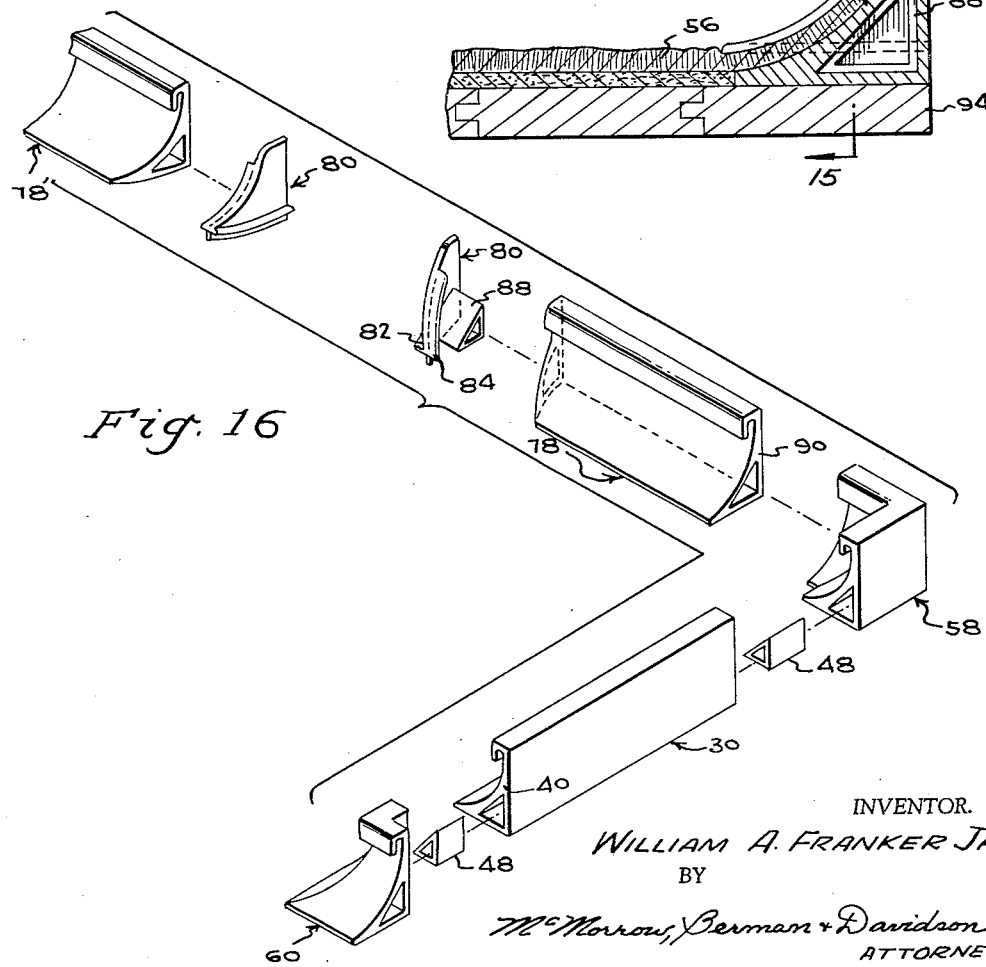

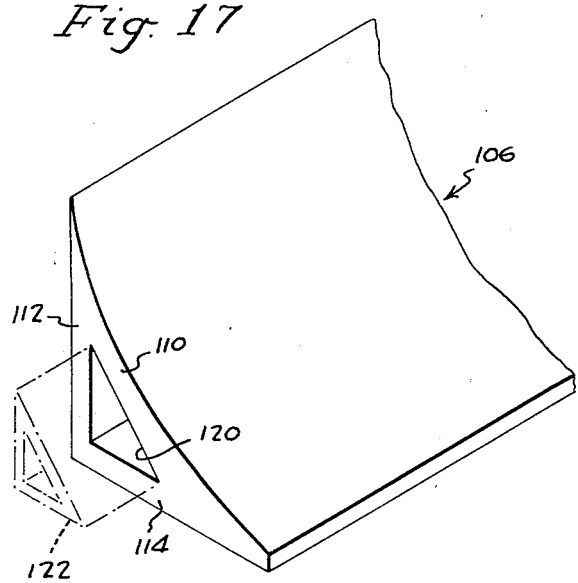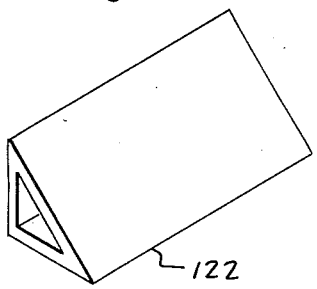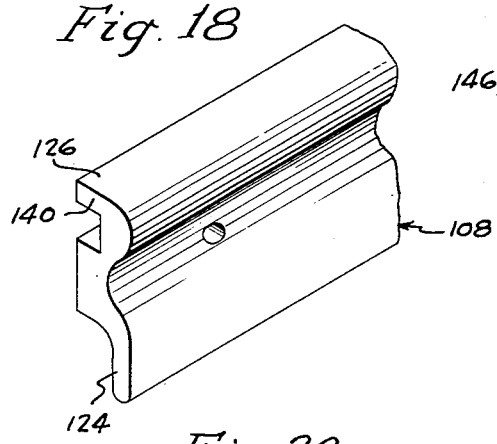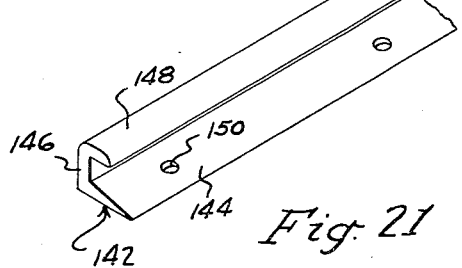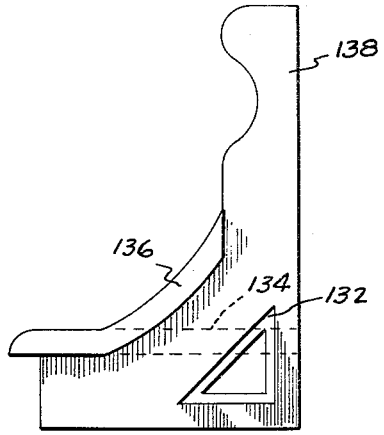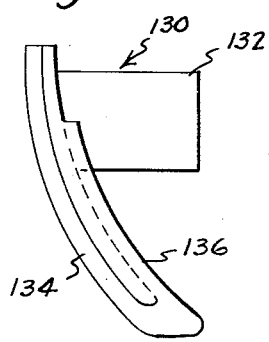

2,994,905
COVE CONSTRUCTION
William A. Franker, Jr., 13104 Houston Ave.,
Chicago, Ill.
Filed Jan. 9, 1959, Ser. No. 785,962
4 Claims. (Cl. 16—7)

The present invention relates to a cove construction for securing an edge portion of a floor covering to the portion of a floor adjacent a wall.

In homes, apartments, and hotels, the floor of most rooms and corridors are covered from wall to wall with carpeting. The means now in use to secure the edge portion of the carpet to the floor adjacent the walls frequently do not blend hormoniously with the modern carpet materials used or with the modern styles of decoration of the walls and ceilings of the rooms. Many cove constructions in use are formed so that dirt and dust gather in the corners. Other cove constructions in use make no provision for carpet edges and corners and adjacent door jambs.

An object of the present invention is to provide a cove construction which is modern in appearance and structure and which blends harmoniously with the presently used materials and decorations employed in rooms of modern homes, hotels, and apartments.

Another object of the present invention is to provide a cove construction having straight wall sections, corner sections, sections for use adjacent door jambs, and closure members for extending over the ends of the sections so that the cove construction is complete when installed and has a pleasant appearance.

A further object of the present invention is to provide a cove construction which has no corners or crevices to gather dust or dirt, and one which supports carpeting or other floor covering in a hygienic manner permitting the carpet or floor covering to be completely cleaned.

A still further object of the present invention is to provide a cover construction which may be fabricated of hard rubber, or of vinyl, Bakelite, or other plastic, and in any desired color to blend with the floor covering.

Yet another object of the present invention is to provide a cove construction which is simple in structure, one sturdy in construction, and one which is economically feasible.

These and other objects and advantages of the present invention will be fully apparent from the following description when taken in conjunction with the annexed drawings, in which:

FIGURE 1 is an isometric view of a portion of a room showing the cove construction according to the present invention installed upon the portion of the floor of the room adjacent the walls of the room and on each side of a door jamb;

FIGURE 2 is an isometric view of one of the sections of the cove construction according to the present invention, the dotted line showing indicating the projecting end portion of a fastening element used to secure adjacent sections together;

FIGURE 3 is an isometric view of another cove construction section according to the present invention, with a fastening element shown in dotted lines;

FIGURE 4 is another isometric view of a further cove construction section;

FIGURE 5 is an isometric view of the fastening element employed in the cove construction of the present invention;

FIGURE 6 is a top plan view of a cove section;

FIGURE 7 is a top plan view of a closure member employed with the section of FIGURE 6;

FIGURE 8 is a top plan view of the cove section of FIGURE 2;

FIGURE 9 is an end view of one of the closure members used with the section shown in FIGURES 2 and 8;

FIGURE 10 is a sectonal view showing how a floor covering is secured to a wooden floor using the cove construction of the present invention and employing a supporting carpet pad;

FIGURE 11 is a sectional view showing how an attaching tab is secured to the underside of a floor covering;

FIGURE 12 is a sectional view showing how a floor covering is secured to a concrete floor, using the cove construction of the present invention;

FIGURE 13 is a fragmentary plan view of a portion of a carpet adjacent a door jamb, showing the closure member of FIGURE 7 secured to the section shown in FIGURE 6;

FIGURE 14 is a view taken on the line 14—14 of FIGURE 13;

FIGURE 15 is a view taken on the line 15—15 of FIGURE 14;

FIGURE 16 is an exploded view of the sections of the cove construction of the present invention, showing their installation on a floor as if adjacent a corner wall section;

FIGURE 17 is an isometric view of a modified form of the cove construction according to the present invention;

FIGURE 18 is an isometric view of a cap molding for use with the section shown in FIGURE 17;

FIGURE 19 is a sectional view showing how the floor covering is secured to the portion of a floor adjacent a wall with the cove and cap molding shown in FIGURES 17 and 18, respectively;

FIGURE 20 is a top plan view of a closure member used with the section shown in FIGURE 17 adjacent a door jamb;

FIGURE 21 is an elevational view of a closure member for use with the cove section shown in FIGURE 17 and the cap molding shown in FIGURE 18;

FIGURE 22 is an isometric view of the fastening element used to secure together two of the sections shown in FIGURE 17; and FIGURE 23 is an isometric view of a molding used to secure a floor covering to a floor surface adjacent the lower ends of a door jamb.

The cove construction of the present invention, FIGURES 1 to 9, inclusive, includes two or more cove sections 30 arranged in confronting end to end relation, as shown in FIGURE 1. Each cove section 30 (FIGURE 2) comprises a horizontally disposed base 32 having spaced side edges 34 and 36 and two ends 38 and 40. The end 38 is shown in FIGURE 2 and the end 40 is shown in FIGURE 16.

An upstanding backing 42 rises from the side edge 34, only a corner of which is shown in FIGURE 2, the backing 42 being formed integrally with the base 32.

A cove-shaped connecting element 44 extends from the top of the backing 42 and merges into the side edge 36 of the base 32.

There is a triangularly shaped opening 46 extending completely through each of the cove sections 30 from one end to the other end. Each opening 46 is adapted to receive a conformably shaped fastening element therein for securing the sections 30 together.

The fastening element is to secure adjacent sections 30 together as shown in FIGURE 5 in full lines and in dotted lines in FIGURE 2 and is designated by the reference numeral 48.

The present invention provides a closure member, as at 50 in FIGURE 9, for bridging either end of the cove sections 30, such closure member 50 being formed in lefts and rights, the left one being shown in FIGURE 9. The closure member 50 is on one end of a fastening element 48' and the closure member 50 bridges and abuts the end of the section 30 through which the fastening element 48' has been inserted.

As shown in FIGURE 1, the pair of sections 30 are arranged so that the end face of one section abuts the confronting end face of the other section, it being understood that one of the fastening elements 48 extends into the openings 46 in the sections 30 inwardly of each of the confronting end faces of the section 30 and secure the sections 30 in end to end relation.

An overhanging embracing means embodying a horizontal flange 52 extends from the upper end of the backing 42 of each section 30 toward the side edge 36 of the base 32. A vertical leg member 54 depends from the free end of the flange 52, as shown in FIGURE 2. The flange 52 and the leg member 54 are adapted to embracingly receive the edge portion of a floor covering or carpet 56 when the latter is supported upon the cove-shaped connecting element 44 of each section 30, as shown in FIGURE 10.

In FIGURES 1, 3, 4, and 16, interior and exterior cove corner sections 58 and 60 are shown. The cove corner section 58 has a base 62, a backing 64 rising from each of two contiguous side edges of the base 62 and cove-shaped connecting elements 66 extending from the upper end of each of the backings 64 to and merging with the other contiguous side edges of the base 62, as shown most clearly in FIGURE 3.

The backings 64 of the cove corner section 58 are arranged at a right angle with respect to each other and the one ends of the cove corner section 58 are cut on a diagonal and formed integrally together or secured together whichever is found to be practical. The other ends of the corner section 58 are arranged at right angles with respect to each other and each have openings extending inwardly from such end. One of the fastening elements 48, shown in dotted lines in FIGURE 3, is used to secure the cove corner section 58 to an adjacent section 30, as shown in FIGURE 1.

The other cove corner section 60 is similarly provided with a base 70 and a pair of backings 72 arranged at a right angle with respect to each other rising from two edges of the base 70, only one backing being shown in edge view in FIGURE 4. Cove-shaped connecting elements 74 extend from the upper ends of the backings 72 and merge with the opposed and contiguous side edges of the base 70. Openings 76 extend inwardly from each of the end faces of the cove corner section 60 and are adapted to receive an end portion of one of the fastening elements 48 for securing the cove corner section 60 to an adjacent end of a section 30, as shown in FIGURE 1.

In FIGURE 6 a modified form of the section 30 is shown and is designated by the numeral 78. This cove section 78 has each of its ends arcuately curved. A special closure member 80 is employed to close either or both ends of the section 78. Such closure member 80 is shown in FIGURE 7 and is seen to be arcuately curved with an external flange 82 adapted to overlie, as in FIGURE 13, a portion of the carpet 56. Another flange 84 projects inwardly of the closure member 80 and is adapted to overlie the edge portion of the carpet 56 which is supported upon the cove-shaped connecting element 86 of the adjacent cove section 78, as shown in FIGURE 14. The section 78 is provided with a flange 52' and a leg member 54' depending from the free end of the flange 52'. The flange 52' and the leg member 54' are adapted to overlie the edge portion of the carpet 56 when the latter is supported upon the connecting element 86 of the section 78.

A fastening element 88 carries on one end the closure member 80 and is insertable into the opening provided in the section 78, as shown in dotted lines in FIGURE 13.

In FIGURE 16, one of the sections 78 has been modified so as to have a right-angled one end face 90 for abutting and securement to the right-angled face of the cove corner section 58. It is understood that one of the fastening elements 48 is inserted in the registering openings in the section 78' and the section 58. The other end of the section 78' is curved to receive in abutting relation the closure member 80. Such closure members 80 are employed on either side of a doorway bounded by door jambs 92, as shown in FIGURE 1. The closure member 80 on the left side of the doorway is formed as a left counterpart of the right form shown in FIGURE 16 on the right side of the doorway. Either the section 78 or 78' may be employed in conjunction with either closure member 80, depending upon the location of the doorway and the employment of one or more sections 30 in continuing the cove construction of the present invention along the portion of the floor 94 of a room adjacent the lower end of walls 96.

In FIGURES 10 and 11 is shown the means by which the carpet 56 is attached to the floor 94 so that the portion adjacent the edge will not pull away from its supporting position upon the connecting element 44 of the adjacent section 30. This means consists in a strip of flexible material, as at 98, having a portion adjacent one end secured by adhesive to the undersurface of the carpet 56. A pad 100 is first positioned to overlie the floor 94 between the free edges of the section 30 and the pad 100 is provided with a slit for each strip 88 as at 102. Each strip 98 is projected through the adjacent slit 102 and the pad 100 and is secured by suitable fastening means such as a tack 104 to the floor 94. This restrains movement of the carpet 56 in areas where there are a number of people walking thereon.

In FIGURE 17 is shown a modified form of the cove section of the present invention in which the flange and depending leg are omitted from the upper end of the backing. This form of cove section is designated generally by the reference numeral 106 and is used with a cap molding 108 for embracing the upper edge portion of the carpet 56 when the latter is supported upon the cove-shaped connecting element 110 of the cove section 106, as shown in FIGURE 19. The cover section 106 includes a backing 112 and a base 114 which, like the base 32, is adapted to rest upon and be secured to a floor surface. The base 114, backing 112 and connecting element 110 are arranged with respect to each other as described with respect to the base 32, backing 42 and connecting element 44 of the section 30.

The same means is used to secure the carpet 56 to the floor 94 in FIGURE 19 as was heretofore described with respect to the carpet 56 and the section 30 in FIGURE 10. In FIGURE 12 the carpet 56 is secured in a like manner to a concrete floor 116 in which a batten strip 118 is embedded for receiving the tack 104.

The cove section 106 is provided with an opening 120 receiving a fastening element 122 (FIGURE 22) conformably shaped to fit within the opening 120 and insertable into and withdrawable from the opening inwardly of the end face of the cove section 106.

The cap molding 108 is provided with a depending skirt 124 and an upper U-shaped portion 126, the free ends of the legs of the portion 126 being adapted to bear against the wall surface when the cap molding 108 is attached to the wall by means of wood screws 128, as shown in FIGURE 19.

In FIGURES 20 and 21, a closure member 130 is shown which is for use with the cove section 106 and cap molding 108. This form of closure member 130 is similar to the closure member 80 and has a fastening element 132, a first flange 134 arranged horizontally and a second flange 136 arranged so as to overlie the carpet when the carpet is supported upon the connecting element 110 of the cove section 106. The closure member 130 has an upper end portion 138 conformably shaped to the end face 40 of the cap molding 108. The portion 138 will overlie and complete the appearance of the assembly of the cove section 106 with the cap molding 108 in the cove construction of the present invention in its modified form.

In FIGURE 23, an embracing strip means 142 is shown which is employed for securing the edge of the carpet at the lower end of the door jambs 92 in FIGURE 1. The strip means 142 includes a base 144, a backing 146, and a forwardly projecting flange 148 which is adapted to overlie and embracingly secure the edge portion of the carpet 56 when secured to the floor 94. Holes 150 are provided at intervals along the base 144 for securement of the strip means 142 to the floor 94.

In use, the cove construction of the present invention is employed to secure a floor covering to a portion of a floor adjacent a wall with the floor covering, such as the carpet 56, having an edge portion supported upon the cove-shaped connecting element 44 of the section 30, or upon the connecting element 110 of the cove section 106, and also upon the associated connecting elements 66 and 74 of the cove corner sections 58 and 60, respectively, where employed.

The extreme edge portion of the floor covering or carpet 56 is received within the confines of the leg 54 when the section 30 is employed or beneath the skirt 124 when the cap molding 108 is employed.

The means shown in FIGURES 10, 11, 12, and 19 are preferred methods of securing the carpet 56 to the floor 94 so that the portion inwardly of the edge remains in position upon the associated cove section even under the stress of constant walking thereon. This is especially important when the cove structure of the present invention is employed in corridors of hotels and apartments or in rooms more or less constantly in use by a number of persons.

The cove construction according to the present invention in each of its forms has a modern appearance which harmonizes with the modern floor coverings and wall treatments in homes, apartments, and hotels of recent construction and decorative treatment.

What is claimed is:

1. In a cove construction, a cove section including a horizontally disposed base having spaced side edges and two ends and adapted to rest upon a floor surface adjacent a wall, an upstanding backing rising from and integral with one of the side edges of said base, a cove-shaped connecting element extending from the top of said backing to and integrally merging into the other side edge of said base, there being a triangularly shaped opening extending completely through said section from one end to the other end, an overhanging embracing means on the upper end of said backing and adapted to receive an edge portion of a floor covering when supported upon said cove-shaped connecting element, said embracing means embodying a horizontal flange extending from the upper end of said backing toward the other side edge of said base, and a vertical leg member depending from the free end of said flange, and a fastening element conformably shaped to fit within said opening insertable into and withdrawable from either of said ends of said cove section.

2. In a cove construction, a cove section including a horizontally disposed base having spaced side edges and two ends and adapted to rest upon a floor surface adjacent a wall, an upstanding backing rising from and integral with one of the side edges of said base, a cove-shaped connecting element extending from the top of said backing to and integrally merging into the other side edge of said base, there being a triangularly shaped opening extending completely through said section from one end to the other end, an overhanging embracing means on the upper end of said backing and adapted to receive an edge portion of a floor covering when supported upon said cove-shaped connecting element, said embracing means embodying a horizontal flange extending from the upper end of said backing toward the other side edge of said base, and a vertical leg member depending from the free end of said flange, a fastening element conformably shaped to fit within said opening insertable into and withdrawable from either of said ends of said cove section, a closure member conformably shaped to bridge an end of said section secured on one end of said fastening element, said closure member bridging and abutting the end of said section through which said fastening element has been inserted.

3. In a cove construction, a pair of sections arranged in confronting end to end relation, each of said sections comprising a horizontally disposed base having spaced side edges and two ends and adapted to rest upon a floor surface adjacent a wall, an upstanding backing rising from and integral with one of the side edges of said base, a cove-shaped connecting element extending from the top of said backing to and integrally merging into the other side edge of said base, there being a triangularly shaped opening extending completely through each of said sections from one end to the other end, each of said openings being adapted to receive a conformably shaped fastening element, said sections being arranged so that the end face of one section abuts the confronting end face of the other section, an overhanging embracing means on the upper end of said backing and adapted to receive an edge portion of a floor covering when supported upon said cove-shaped connecting element, said embracing means embodying a horizontal flange extending from the upper end of said backing toward the other side edge of said base, and a vertical leg member depending from the free end of said flange, and a fastening element conformably shaped to fit within said openings extending into said openings inwardly of each of the confronting end faces of said sections and securing together said sections in end to end relation.

4. In a cove construction, a cove section including a horizontally disposed base having spaced side edges and two ends and adapted to rest upon a floor surface adjacent a wall, an upstanding backing rising from and integral with one of the side edges of said base, a cove-shaped connecting element extending from the top of said backing to and integrally merging into the other side edge of said base, there being a triangularly shaped opening extending completely through said section from one end to the other end, said opening being adapted to receive a conformably shaped fastening element, and an overhanging embracing means on the upper end of said backing and adapted to receive an edge portion of a floor covering when supported upon said cove-shaped connecting element, said embracing means embodying a horizontal flange extending from the upper end of said backing toward the other side edge of said base, and a vertical leg member depending from the free end of said flange.

References Cited in the file of this patent

UNITED STATES PATENTS

| | | |
|---|---|---|
| 349,278 | Johnson | Sept. 14, 1886 |
| 477,721 | Webb | June 28, 1892 |
| 1,208,496 | Cooke | Dec. 12, 1916 |
| 1,722,660 | Connelly | July 30, 1929 |
| 2,867,926 | Cutler | Jan. 13, 1959 |